Jan. 4, 1944.  G. L. DIMMICK  2,338,233
REDUCTION IN REFLECTION FROM TRANSPARENT MATERIAL
Filed July 31, 1940
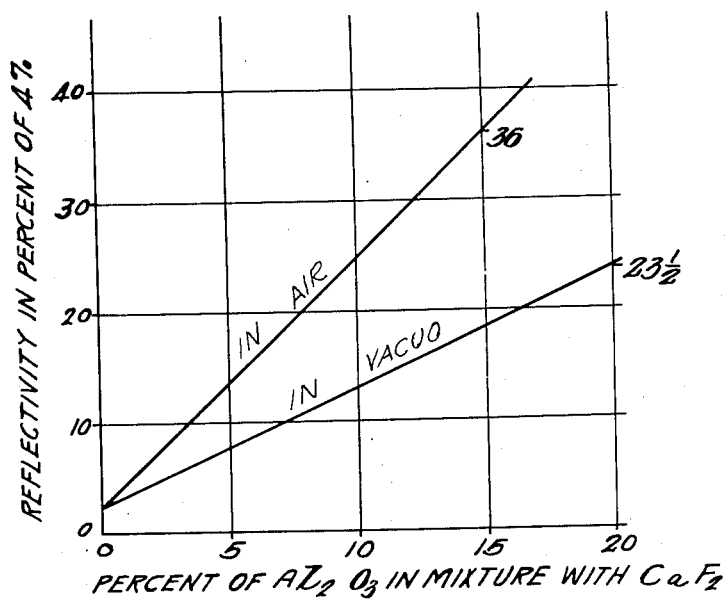
Inventor
Glenn L. Dimmick
By
Attorney Patented Jan. 4, 1944

2,338,233

UNITED STATES PATENT OFFICE 2,338,233

REDUCTION IN REFLECTION FROM TRANSPARENT MATERIAL

Glenn L. Dimmick, Haddonfield, N. J., assignor to Radio Corporation of America, a corporation of Delaware Application July 31, 1940, Serial No. 348,815

8 Claims. (Cl. 88—1)

This invention relates to the reduction of reflection from the surface of transparent materials, such as glass or other materials having approximately the same index of refraction. It has heretofore been proposed to reduce the surface reflection from transparent materials by various methods, such as lightly etching the surface with appropriate chemicals and coating the surface with a layer of material of lower index of refraction and appropriate thickness. It is now generally recognized in the art that a layer of material on the surface of a transparent body which material has an index of refraction the geometric means between that of the material and that of air and which has a thickness of one-quarter of a wave length for the light for which the reflection is to be decreased will reduce the reflection to a minimum.

Many difficulties have heretofore been encountered in the attempts to apply this information practically. Some materials which could be applied in uniform layers of proper thickness do not have the proper index of refraction. Other materials which have the proper index of refraction cannot be applied in uniform layers, and materials having the proper index of refraction which could be applied in uniform layers were unstable either chemically or physically or both.

One of the most successful materials heretofore used has been calcium fluoride which can be applied in a fairly uniform layer by the evaporation process and which has such an index of refraction as to provide a satisfactory reduction in the surface reflection. This material, however, has an unfortunate property of extreme softness and, after it has been applied to a glass surface, it can be readily wiped off even by a soft cloth or lens tissue. This characteristic makes it substantially useless for application to the external surface of lenses or optical systems.

The present invention pertains to a novel coating material and a method of applying the same, avoiding the foregoing difficulties and providing a hard and stable coating of satisfactory optical properties. This is preferably accomplished by mixing aluminum oxide with calcium fluoride and evaporating the mixture on to the surface of the transparent material in a vacuum.

One object of the invention is to provide an improved coating for transparent materials for the purpose of reducing reflection from the surface thereof.

Another object of the invention is to provide a hard transparent coating which may be applied to practically any desired material.

Another object of the invention is to provide a transparent coating which is chemically inert.

Another object of the invention is to provide a hard transparent coating having an index of refraction between that of glass and that of air.

Another object of the invention is to provide an improved method of applying reflection-preventing coatings to the surface of transparent materials.

Other and incidental objects of the invention will be apparent to those skilled in the art from a reading of the following specification in connection with the accompanying drawing in which the single figure of drawing diagrammatically illustrates the relation between the composition of the coating material and the reduction in reflectivity accomplished thereby.

It is now well known in the art to coat glass surfaces with such a material as calcium fluoride by evaporation in a vacuum. In the performance of that process the calcium fluoride is coated on a filament or enclosed within a coil filament, the glass to be coated is placed in appropriate relation thereto under an appropriate container, such as a bell jar, and after evacuation the filament is heated to such a temperature that the calcium fluoride will be vaporized at a controllable rate. The evaporated material deposits more or less uniformly over the surface of the glass to be coated, the degree of uniformity depending upon the area and distance. The thickness of the coating when applied at a suitably low rate can be determined by watching the colors reflected from the surface of the glass and when the appropriate reflection color is reached the process can be stopped leaving a coating which will transmit a maximum of light in the color complementary to that which is reflected.

In the performance of my improved process the same type of apparatus and procedure is used but a different coating material is utilized. Inasmuch as the rate of evaporation of the components of a mixture depends upon the temperature, the specific conditions under which the evaporation is accomplished are first stated.

In the performance of the process in an ordinary sized bell jar about 12 inches in diameter and 16 inches high, a tungsten filament composed of 15 mil wire wound on a one-eighth inch mandrel is used and the evaporation is accomplished in a vacuum of from .1 to .25 micron at a filament current of 8 amperes.

The material which is used is a mixture of calcium fluoride ($CaF_2$) and aluminum oxide, $Al_2O_3$. The aluminum oxide is preferably of the amorphous or precipitated type, as the crystalline form of alumina is not as readily evaporated.

The effect of various percentages of $Al_2O_3$ in the mixture is shown in the single figure of drawing. It should be noted that with increasing percentages of $Al_2O_3$ the reflectivity is increased. The normal reflectivity of the glass surface is approximately four percent and in the drawing the reflectivity is indicated in percentage of the four percent. As the percentage of aluminum oxide increases, the reflectivity, as stated before, increases, but at the same time the hardness of the coating and its adherence to the glass likewise increases. It will be noted that the reflectivity is given both as it appears in the jar at the conclusion of the evaporation process and as it appears after the termination thereof. Apparently, the admission of air to the surface causes an increase in reflectivity which is due to a physical change in the coating.

I have found from tests that the most desirable percentage of aluminum oxide is approximately ten percent by weight of the total material to about 90 percent of calcium fluoride. Up to this percentage the hardness and adherence of the film increases rapidly but above this percentage although the reflectivity increases the hardness does not increase nearly so rapidly. These percentages as indicated above are those of the material which is placed in the filament and do not indicate the composition of the material deposited on the glass as the rate of evaporation of the $Al_2O_3$ is probably very much less than that of the $CaF_2$.

The temperature of the filament of the type above given as measured by an optical pyrometer through the bell jar during evaporation is approximately 1580° centigrade and any material variation of this temperature causes a variation in the composition of the material precipitated. At a lower temperature a greater percentage of fluoride evaporates while at a higher temperature the larger percentage of alumina evaporates and the composition of the mixture must be correspondingly varied. The percentage of alumina falls off quite rapidly and at a filament current of approximately 7 amperes practically no alumina is evaporated. With the composition and filament temperature given above both the percentage of material deposited and the rate of evaporation are quite convenient to handle as the layer reaches the proper thickness of a quarter of a wave length in the middle of the visual spectrum in about one minute.

It is not known whether aluminum oxide and calcium fluoride form a chemical compound or whether they function merely as a physical mixture, and whichever it may be is immaterial to applicant's purpose so long as a hard tenacious film of the proper optical properties is formed.

It will be apparent to those skilled in the art that my invention is not limited to the specific percentages of material or temperatures stated above and that the composition of the evaporated mixture and the temperature may be varied over a considerable range within the scope of the invention.

I claim as my invention:

1. An optical element and a reflection reducing coating thereon comprising the evaporation product of a mixture of calcium fluoride and aluminum oxide.

2. An optical element and a reflection reducing coating thereon comprising the evaporation product of a mixture of 90 percent calcium fluoride and 10 percent aluminum oxide.

3. The method of treating an optical element to reduce surface reflection including the step of evaporating a mixture of calcium fluoride and aluminum oxide and depositing said vapor on said surface in a vacuum.

4. The method of treating an optical element to reduce surface reflection including the step of evaporating a mixture of substantially 90% calcium fluoride and substantially 10% aluminum oxide and depositing said vapor on said surface in a vacuum.

5. An optical element and a reflection reducing coating thereon comprising an evaporation product of a mixture of calcium fluoride and amorphous aluminum oxide.

6. The method of treating an optical element to reduce surface reflection including the step of evaporating a mixture of calcium fluoride and amorphous aluminum oxide, and depositing the vapor on said surface in a vacuum.

7. The method of treating an optical element to reduce surface reflection including the step of evaporating a mixture of substantially 90% calcium fluoride and substantially 10% amorphous aluminum oxide, and depositing the vapor on said surface in a vacuum.

8. The method of treating an optical element to reduce surface reflection including the step of evaporating a mixture of substantially 90% calcium fluoride and substantially 10% amorphous aluminum oxide at a temperature of approximately 1580° C., and depositing the vapor on said surface in a vacuum.

GLENN L. DIMMICK.